United States Patent
Apone et al.

(10) Patent No.: US 12,054,083 B2
(45) Date of Patent: Aug. 6, 2024

(54) VEHICLE INCLUDING A SEAT HAVING RECONFIGURABLE BOLSTERS

(71) Applicant: GM Global Technology Operations LLC, Detroit, MI (US)

(72) Inventors: Michael Apone, Macomb, MI (US); Mirza Grebovic, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/940,290

(22) Filed: Sep. 8, 2022

(65) Prior Publication Data

US 2024/0083318 A1    Mar. 14, 2024

(51) Int. Cl.
*B60N 2/90* (2018.01)
*B60N 2/02* (2006.01)
*B60N 2/885* (2018.01)

(52) U.S. Cl.
CPC ............ *B60N 2/99* (2018.02); *B60N 2/02* (2013.01); *B60N 2/02246* (2023.08); *B60N 2/885* (2018.02); *B60N 2/986* (2018.02)

(58) Field of Classification Search
CPC . B60N 2/99; B60N 2/02; B60N 2/986; B60N 2/885; B60N 2/02246
See application file for complete search history.

(56) References Cited

U.S. PATENT DOCUMENTS

| | | | |
|---|---|---|---|
| 6,659,553 B2 * | 12/2003 | Achleitner | B60N 2/986 297/250.1 |
| 7,131,697 B2 * | 11/2006 | Beermann | B60N 2/24 297/354.12 |
| 10,457,181 B2 * | 10/2019 | Stevens | B60N 2/02246 |
| 11,052,794 B2 * | 7/2021 | Hunsaker | B60N 2/914 |

* cited by examiner

*Primary Examiner* — Syed A Islam
(74) *Attorney, Agent, or Firm* — CANTOR COLBURN LLP

(57) ABSTRACT

A vehicle seat includes a seat base including a seating surface flanked by a first side bolster and a second side bolster and a seat back including a support surface flanked by a third side bolster and a fourth side bolster. At least one of the first side bolster, the second side bolster, the third side bolster, and the fourth side bolster is selectively shiftable relative to a corresponding one of the seating surface and the support surface.

20 Claims, 4 Drawing Sheets

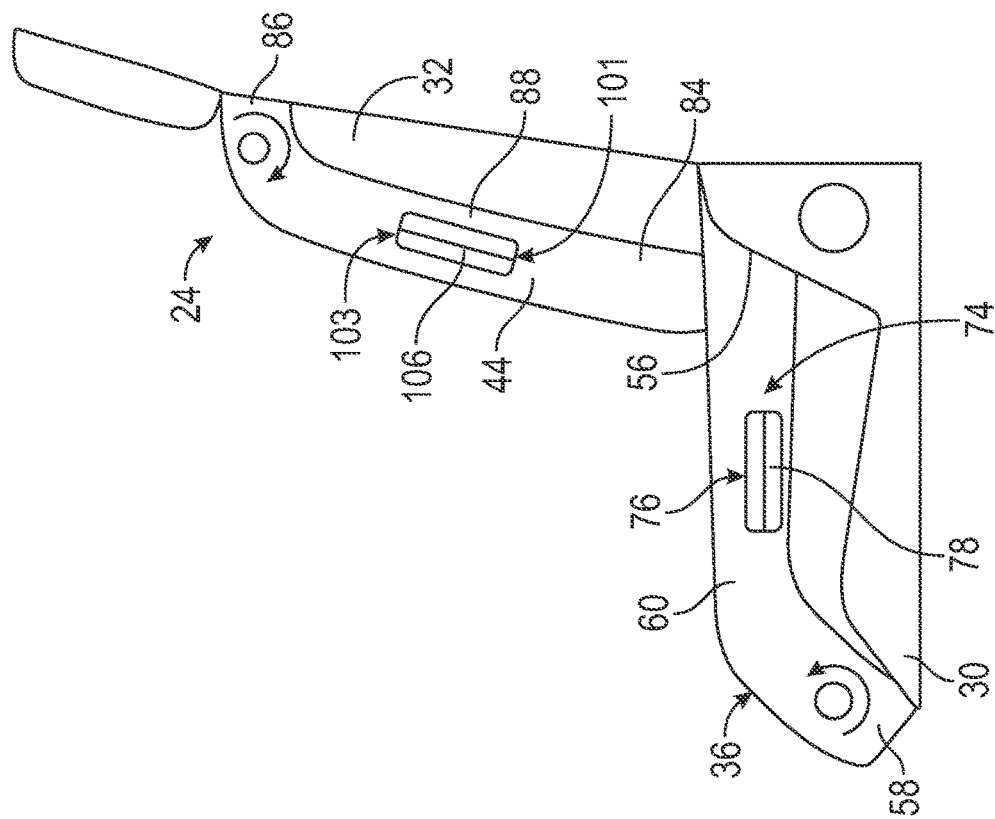
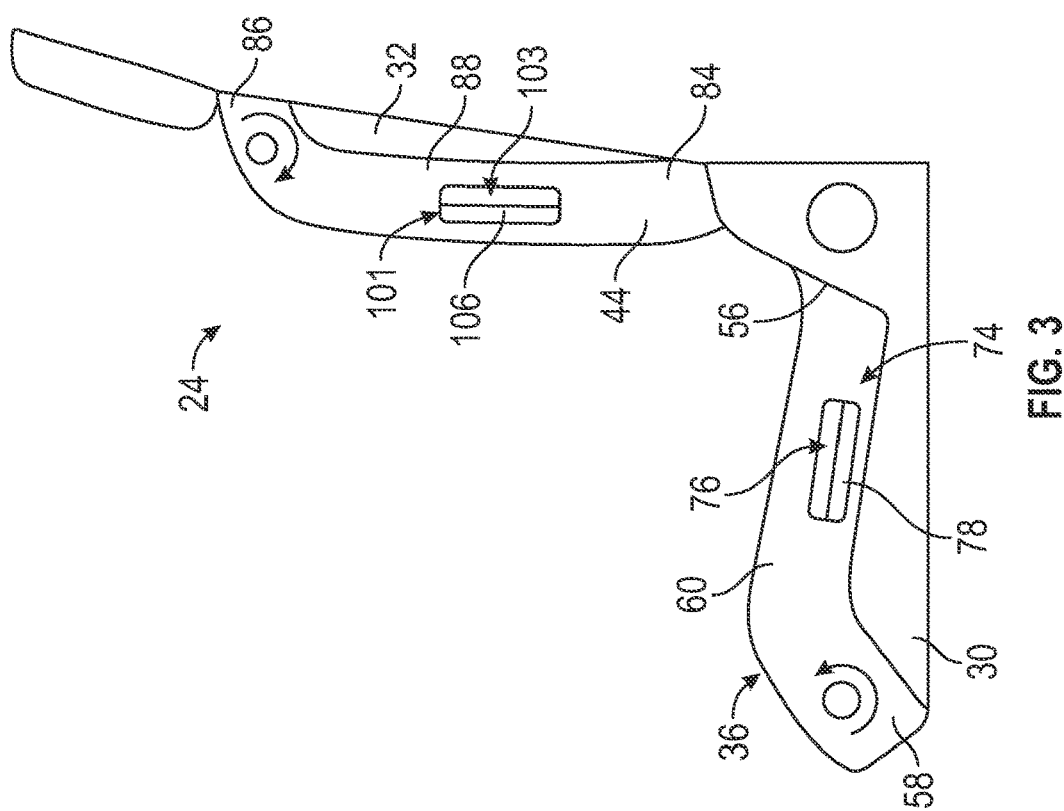

VEHICLE INCLUDING A SEAT HAVING RECONFIGURABLE BOLSTERS

INTRODUCTION

The subject disclosure relates to the art of vehicles and, more particularly, to a vehicle including a seat having reconfigurable bolsters.

Non-performance vehicles typically include standard seats having side bolters that provide minimal support to an occupant. Side bolsters that project outwardly from a seat surface provide support and comfort. However, there is a trade-off between support and convenience. On the downside, standard bolsters, or bolsters that extend above a seating surface a small amount provide minimal support. On the upside, standard bolsters do not impede ingress and exiting the vehicle.

Larger bolsters are favored by drivers of performance vehicles. Larger bolsters provide greater support, particularly during vehicle maneuvers. However, the larger bolsters make getting into and out from the vehicle difficult. Accordingly, it is desirable to provide bolsters in a vehicle that not only provide support while the vehicle is maneuvering but also allow for easy ingress and exiting of the vehicle.

SUMMARY

A vehicle seat, in accordance with a non-limiting example, includes a seat base including a seating surface flanked by a first side bolster and a second side bolster and a seat back including a support surface flanked by a third side bolster and a fourth side bolster. At least one of the first side bolster, the second side bolster, the third side bolster, and the fourth side bolster is selectively shiftable relative to a corresponding one of the seating surface and the support surface.

In addition to one or more of the features described herein the first side bolster includes a first end arranged adjacent the seat back and a second end pivotally mounted to the seat base, the first side bolster being selectively upwardly rotatable relative to the seat base.

In addition to one or more of the features described herein the second side bolster includes a first end portion arranged adjacent the seat back and a second end portion pivotally mounted to the seat base, the second side bolster being selectively upwardly rotatable relative to the seat base.

In addition to one or more of the features described herein an actuator is mounted to the first side bolster, the actuator selectively releasing the first side bolster to pivot about the second end.

In addition to one or more of the features described herein the actuator is operatively connected to each of the first side bolster and the second side bolster.

In addition to one or more of the features described herein the actuator comprises a mechanical latch.

In addition to one or more of the features described herein the first side bolster includes a first end arranged adjacent the seat back and a second end that is opposite the first end, each of the first end and the second end being shiftable relative to the seat base.

In addition to one or more of the features described herein the third side bolster includes a first end section arranged adjacent the seat base and a second end section pivotally mounted to the seat back, the third side bolster being selectively outwardly rotatable relative to the seat base.

In addition to one or more of the features described herein an actuator member is mounted to the third side bolster, the actuator member selectively releasing the third side bolster to pivot about the second end section.

In addition to one or more of the features described herein the actuator member is operatively connected to each of the third side bolster and the fourth side bolster.

A vehicle, in accordance with a non-limiting example, includes a body defining a passenger compartment including a dashboard, and a steering system and a vehicle seat arranged in the passenger compartment adjacent the steering system. The vehicle seat includes a seat base including a seating surface flanked by a first side bolster and a second side bolster, and a seat back including a support surface flanked by a third side bolster and a fourth side bolster. At least one of the first side bolster, the second side bolster, the third side bolster, and the fourth side bolster is selectively shiftable relative to a corresponding one of the seating surface and the support surface.

In addition to one or more of the features described herein the first side bolster includes a first end arranged adjacent the seat back and a second end pivotally mounted to the seat base, the first side bolster being selectively upwardly rotatable relative to the seat base.

In addition to one or more of the features described herein the second side bolster includes a first end portion arranged adjacent the seat back and a second end portion pivotally mounted to the seat base, the second side bolster being selectively upwardly rotatable relative to the seat base.

In addition to one or more of the features described herein an actuator is mounted to the first side bolster, the actuator selectively releasing the first side bolster to pivot about the second end.

In addition to one or more of the features described herein the actuator is operatively connected to each of the first side bolster and the second side bolster.

In addition to one or more of the features described herein the actuator comprises a mechanical latch.

In addition to one or more of the features described herein the first side bolster includes a first end arranged adjacent the seat back and a second end that is opposite the first end, each of the first end and the second end being shiftable relative to the seat base.

In addition to one or more of the features described herein the third side bolster includes a first end section arranged adjacent the seat base and a second end section pivotally mounted to the seat back, the third side bolster being selectively outwardly rotatable relative to the seat base.

In addition to one or more of the features described herein an actuator member mounted to the third side bolster, the actuator member selectively releasing the third side bolster to pivot about the second end section.

In addition to one or more of the features described herein the actuator member is operatively connected to each of the third side bolster and the fourth side bolster.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 is a side view of the seat of FIG. 2 having a first selectively reconfigurable bolster and a second selectively reconfigurable bolster in a first configuration, in accordance with a non-limiting example;

FIG. 4 is a side view of the seat of FIG. 3 depicting the first selectively reconfigurable bolster and the second selectively reconfigurable bolster in a second configuration, in accordance with a non-limiting example;

DETAILED DESCRIPTION

Figure 1:
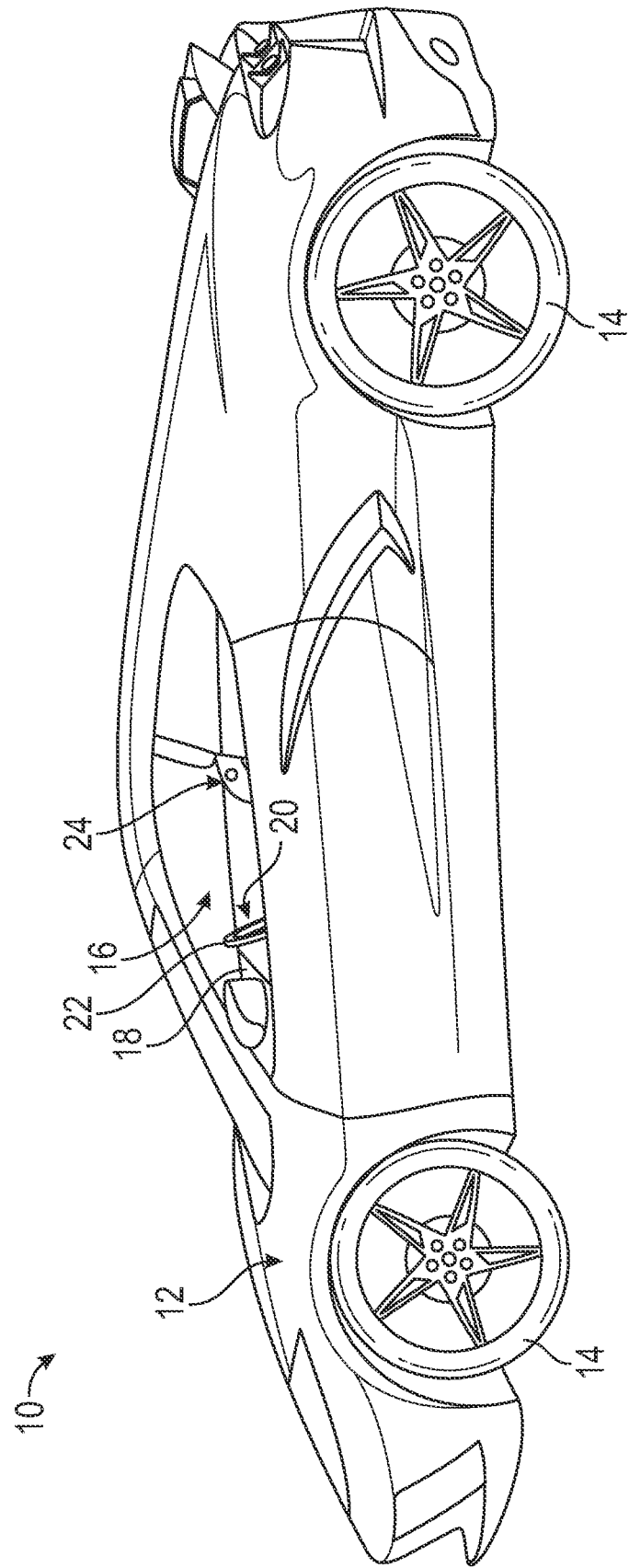
FIG. 1 is a side view of a vehicle including a seat having selectively reconfigurable bolsters, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported by a plurality of wheels, two of which are indicated at 14. In the non-limiting example shown, two of the plurality of wheels 14 are steerable wheels. That is, changing a position of the two front wheels of the plurality of wheels 14 relative to body 12 will cause vehicle 10 to change direction. Body 12 defines a passenger compartment 16 within which is arranged a dashboard 18 and a steering system 20 including a steering wheel 22. Manipulation of steering wheel 22 changes a position of the steerable wheels. A seat 24 is arranged aft of steering wheel 22. Of course, it should be understood that vehicle 10 may be an autonomous vehicle and thus may not include a steering wheel.

Figure 2:
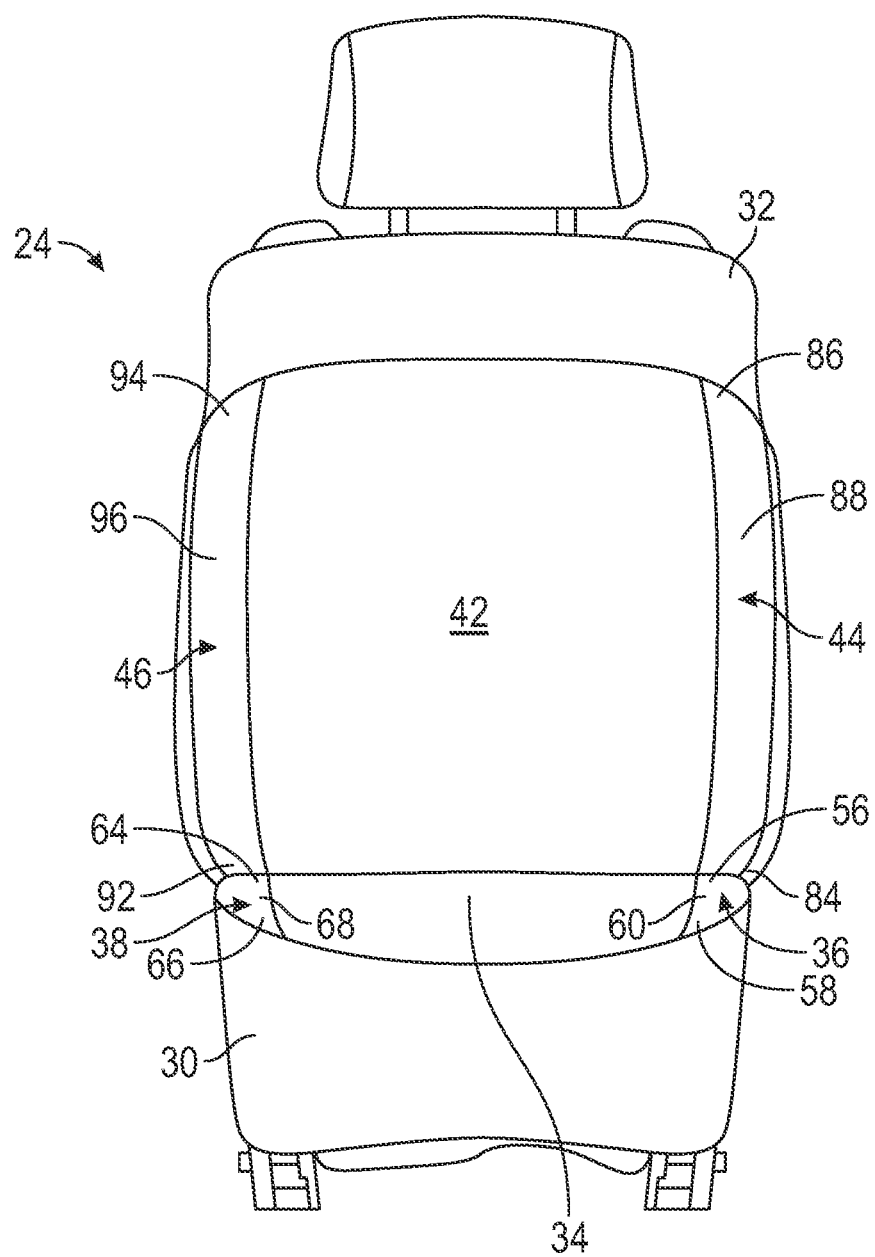
FIG. 2 is a front plan view of the seat having selectively reconfigurable bolsters, in accordance with a non-limiting example.

Referring to FIG. 2, seat 24 includes a seat base 30 and a seat back 32. Seat back 32 is pivotally mounted relative to seat base 30. Seat base 30 includes a seating surface 34 flanked by a first side bolster 36 and a second side bolster 38. Seat back 32 includes a support surface 42 flanked by a third side bolster 44 and a fourth side bolster 46. As will be detailed herein, first side bolster 36 and second side bolster 38 are selectively shiftable relative to seating surface 34 and third side bolster 44 and fourth side bolster 46 are selectively shiftable relative to support surface 42. First and second side bolsters 36 and 38, and third and fourth side bolsters 44 and 46 may be shifted from a stowed position (FIG. 3) to allow easy ingress and egress from vehicle 10 and a deployed position (FIG. 4) to provide added support to an occupant, particularly while maneuvering the vehicle.

Referring to FIGS. 3 and 4 with continued reference to FIG. 2, first side bolster 36 includes a first end 56, a second end 58, and an intermediate portion 60 extending between first end 56 and second end 58. In accordance with a non-limiting example, first end 56 is positioned adjacent to seat back 32 and second end 58 is pivotally connected to seat base 30. Similarly, second side bolster 38 includes a first end portion 64, a second end portion 66, and an intermediate portion 68 extending between first end portion 64 and second end portion 66. First end portion 64 is positioned adjacent to seat back 32 and second end portion 66 is pivotally mounted relative to seat base 34.

In accordance with a non-limiting example, seat 24 includes a first actuator 74 mounted to intermediate portion 60 of first side bolster 36. Actuator 74 may take the form of a mechanical latch 76 associated with a handle or lever 78. When operated, lever 78 may release first side bolster 36 from a first configuration or stowed position (FIG. 3) allowing first side bolster 36 to transition to a second configuration or deployed position (FIG. 4). In a non-limiting example, second side bolster 38 may include a second actuator (not shown). In still another non-limiting example, actuator 72 may be connected to, and selectively operate both first side bolster 36 and second side bolster 38.

In a non-limiting example, in addition to adjusting first side bolster 36 and second side bolster 38, third side bolster 44 and fourth side bolster 46 may also be adjustable. For example, third side bolster 44 includes a first end section 84, a second end section 86, and an intermediate section 88. First end section 84 is arranged adjacent to seat base 30 and second end section 86 is pivotally mounted relative to seat back 32.

Similarly, fourth side bolster 46 includes a first end segment 92, a second end segment 94, and an intermediate segment 96. First end segment 92 is arranged adjacent to seat base 30 and second end segment 94 is pivotally mounted relative to seat back 32. In a non-limiting example, third side bolster 46 includes an actuator member 101 mounted to intermediate section 88. Actuator member 101 may take the form of a mechanical latch 103 associated with a handle or lever 106. When operated, lever 106 may release third side bolster 44 from a first configuration or stowed position (FIG. 3) allowing third side bolster 44 to transition to a second configuration or deployed position (FIG. 4). Fourth side bolster 44 may include another actuator member (not shown). Alternatively, actuator member 101 may control both third side bolster 44 and fourth side bolster 46.

Figure 5:
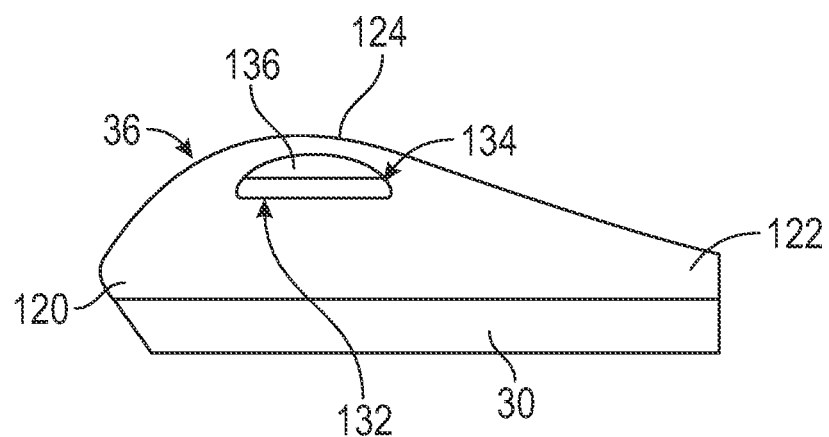
FIG. 5 is a side view of the seat having a selectively reconfigurable bolster shown in a first configuration, in accordance with a non-limiting example.
Figure 6:
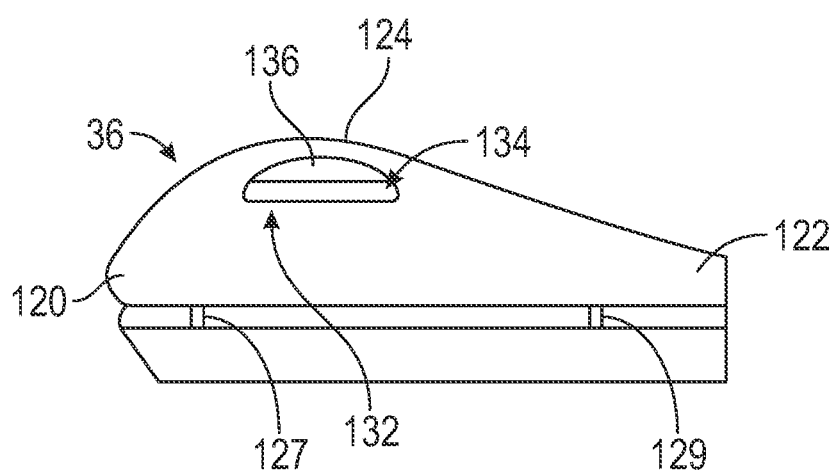
FIG. 6 is a side view of the seat of FIG. 5 depicting the selectively reconfigurable bolster in a second configuration, in accordance with a non-limiting example.

Reference will now follow to FIGS. 5 and 6 in describing first side bolster 36 in accordance with another non-limiting example with an understanding that second, third, and fourth side bolsters 38, 44, and 46 may include similar structure. First side bolster 36 includes a first end 120, a second end 122 and an intermediate portion 124. In a non-limiting example, both first end 120 and second end 122 may translate relative to seat base 30. That is, seat base 30 includes a first track 127 and a second track 129. First end 120 is operatively connected with first track 127 and second end 122 is operatively connected with second track 129.

First side bolster 36 includes an actuator 132 that may take the form of a mechanical latch 134 that is operated by a handle or lever 136. When operated, actuator 132 releases first side bolster 36 to linearly translate between a first or stowed configuration (FIG. 5) and a second or deployed configuration (FIG. 6). In the first configuration, occupants may enter or exit vehicle 10 unimpeded. In the second configuration, first, second, third, and/or fourth side bolsters 36, 38, 44, and/or 46 provide support to an occupant, particularly while maneuvering vehicle 10 at track speeds. At this point, it should be understood that while shown in connection with first side bolster 36, each of the second, third, and/or forth side bolsters 38, 44, and 46 may include similar structure.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle seat comprising:
    a seat base including a seating surface including a forward edge and a rear edge, the seating surface being flanked by a first side bolster and a second side bolster; and
    a seat back including a support surface having an upper edge and a lower edge, the support surface being flanked by a third side bolster and a fourth side bolster,
    wherein at least one of the third side bolster and the fourth side bolster is selectively rotatable about an axis arranged at and extending substantially parallel to the upper edge of the support surface, and
    wherein the at least one of the third side bolster and the fourth side bolster has a first configuration in which a bottom surface thereof is in contact with the seat base, and a second configuration in which the bottom surface thereof is in contact with the first side bolster or the second side bolster.

2. The vehicle seat according to claim 1, wherein the first side bolster includes a first end arranged adjacent the seat back and a second end pivotally mounted to the seat base at the forward edge, the first side bolster being selectively upwardly rotatable about the axis relative to the seat base.

3. The vehicle seat according to claim 2, wherein the second side bolster includes a first end portion arranged adjacent the seat back and a second end portion pivotally mounted to the seat base at the forward edge, the second side bolster being selectively upwardly rotatable about the axis relative to the seat base.

4. The vehicle seat according to claim 3, further comprising an actuator mounted to the first side bolster, the actuator selectively releasing the first side bolster to pivot about the axis at the second end.

5. The vehicle seat according to claim 4, wherein the actuator is operatively connected to each of the first side bolster and the second side bolster.

6. The vehicle seat according to claim 4, wherein the actuator comprises a mechanical latch.

7. The vehicle seat according to claim 1, wherein the third side bolster includes a first end section arranged adjacent the seat base and a second end section pivotally mounted to the seat back at the upper edge, the third side bolster being selectively outwardly rotatable about the axis relative to the seat base.

8. The vehicle seat according to claim 7, further comprising an actuator member mounted to the third side bolster, the actuator member selectively releasing the third side bolster to pivot about the axis at the second end section.

9. The vehicle seat according to claim 8, wherein the actuator member is operatively connected to each of the third side bolster and the fourth side bolster.

10. The vehicle seat according to claim 1,
    wherein at least one of the first side bolster and the second side bolster is selectively rotatable about an axis arranged at and extending substantially parallel to a corresponding one of the forward edge of the seating surface, and
    wherein the at least one of the first side bolster and the second side bolster has a first configuration in which an entire bottom surface thereof is in contact with the seat base, and a second configuration in which a space is formed between a majority of the bottom surface thereof and the seat base.

11. A vehicle comprising:
    a body defining a passenger compartment including a dashboard, and a steering system; and
    a vehicle seat arranged in the passenger compartment adjacent the steering system, the vehicle seat including:
    a seat base including a seating surface including a forward edge and a rear edge, the seating surface being flanked by a first side bolster and a second side bolster; and
    a seat back including a support surface having an upper edge and a lower edge, the support surface being flanked by a third side bolster and a fourth side bolster,
    wherein at least one of the third side bolster and the fourth side bolster is selectively rotatable about an axis arranged at and extending substantially parallel to the upper edge of the support surface, and
    wherein the at least one of the third side bolster and the fourth side bolster has a first configuration in which a bottom surface thereof is in contact with the seat base, and a second configuration in which the bottom surface thereof is in contact with the first side bolster or the second side bolster.

12. The vehicle according to claim 11, wherein the first side bolster includes a first end arranged adjacent the seat back and a second end pivotally mounted to the seat base at the forward end, the first side bolster being selectively upwardly rotatable about the axis relative to the seat base.

13. The vehicle according to claim 12, wherein the second side bolster includes a first end portion arranged adjacent the seat back and a second end portion pivotally mounted to the seat base at the forward end, the second side bolster being selectively upwardly rotatable about the axis relative to the seat base.

14. The vehicle according to claim 13, further comprising an actuator mounted to the first side bolster, the actuator selectively releasing the first side bolster to pivot about the axis at the second end.

15. The vehicle according to claim 14, wherein the actuator is operatively connected to each of the first side bolster and the second side bolster.

16. The vehicle according to claim 14, wherein the actuator comprises a mechanical latch.

17. The vehicle according to claim 11, wherein the third side bolster includes a first end section arranged adjacent the seat base and a second end section pivotally mounted to the seat back at the upper edge, the third side bolster being selectively outwardly rotatable about the axis relative to the seat base.

18. The vehicle according to claim 17, further comprising an actuator member mounted to the third side bolster, the actuator member selectively releasing the third side bolster to pivot about the axis at the second end section.

19. The vehicle according to claim 18, wherein the actuator member is operatively connected to each of the third side bolster and the fourth side bolster.

20. The vehicle according to claim 11, wherein at least one of the first side bolster and the second side bolster is selectively rotatable about an axis arranged at and extending substantially parallel to a corresponding one of the forward edge of the seating surface, and wherein the at least one of the first side bolster and the second side bolster has a first configuration in which an entire bottom surface thereof is in contact with the seat base, and a second configuration in which a space is formed between a majority of the bottom surface thereof and the seat base.

* * * * *